United States Patent
Matsunaga et al.

(10) Patent No.: US 12,521,015 B2
(45) Date of Patent: Jan. 13, 2026

(54) OPTICAL SENSOR

(71) Applicant: Magnolia White Corporation, Tokyo (JP)

(72) Inventors: Kazuki Matsunaga, Tokyo (JP); Shigesumi Araki, Tokyo (JP); Yasushi Tomioka, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 0 days.

(21) Appl. No.: 18/679,466

(22) Filed: May 31, 2024

(65) Prior Publication Data

US 2024/0315561 A1   Sep. 26, 2024

Related U.S. Application Data

(63) Continuation of application No. PCT/JP2022/033733, filed on Sep. 8, 2022.

(30) Foreign Application Priority Data

Dec. 1, 2021   (JP) .................................. 2021-195702

(51) Int. Cl.
   *A61B 5/00*   (2006.01)
(52) U.S. Cl.
   CPC .................................. *A61B 5/0059* (2013.01)
(58) Field of Classification Search
   CPC ........ A61B 2562/046; A61B 2562/066; A61B 5/0059; A61B 5/0075; G06T 1/00
   See application file for complete search history.

(56) References Cited

U.S. PATENT DOCUMENTS

| | | | |
|---|---|---|---|
| 11,017,200 B1* | 5/2021 | Wickboldt | .......... H04L 63/0861 |
| 2017/0220840 A1 | 8/2017 | Wickboldt et al. | |
| 2017/0220844 A1* | 8/2017 | Jones | ................ G06V 40/1318 |
| 2018/0098733 A1 | 4/2018 | Chin et al. | |
| 2019/0180072 A1 | 6/2019 | Fomani et al. | |
| 2021/0045705 A1 | 2/2021 | Morii et al. | |

FOREIGN PATENT DOCUMENTS

| | | |
|---|---|---|
| JP | 2019-512762 A | 5/2019 |
| WO | 2019/167145 A1 | 9/2019 |

OTHER PUBLICATIONS

International Search Report and Written Opinion mailed on Nov. 15, 2022, received for International Application No. PCT/JP2022/033733, filed on Sep. 8, 2022, 10 pages including English Translation.

\* cited by examiner

*Primary Examiner* — Christopher L Cook
(74) *Attorney, Agent, or Firm* — XSENSUS LLP

(57) ABSTRACT

Provided is an optical sensor capable of obtaining a plurality of types of information by a plurality of wavelengths in a short time. The optical sensor includes a light receiving part that includes a plurality of pixels disposed in a plane surface and receives light from a measuring object, an interposer that includes a plurality of through holes and is disposed on an upper side of the light receiving part such that one or plurality of the through holes overlap each of the pixels, a first wavelength selecting unit that transmits light in a first wavelength band and overlaps each of the plurality of through holes belonging to a first group, and a second wavelength selecting unit that transmits light in a second wavelength band and overlaps the plurality of through holes belonging to a second group, which is different from the first group.

6 Claims, 13 Drawing Sheets

OPTICAL SENSOR

CROSS-REFERENCE TO RELATED APPLICATIONS

The present application is a Bypass Continuation of International Application No. PCT/JP2022/033733, filed on Sep. 8, 2022, which claims priority from Japanese Application No. JP2021-195702 filed on Dec. 1, 2021. The contents applications are hereby incorporated by reference into this application.

BACKGROUND OF THE INVENTION

1. Field of the Invention

The present invention relates to an optical sensor.

2. Description of the Related Art

An optical sensor irradiates a measuring object with light of a certain wavelength band for sensing reflected light or transmitted light from the measuring object, thereby acquiring predetermined information. For example, the optical sensor irradiates a finger with visible light for sensing reflected light or transmitted light, thereby acquiring information of a fingerprint. Further, the optical sensor irradiates a finger with near-infrared light and sensing transmitted light, thereby acquiring vein information.

The methods of extracting only parallel light from scattered light include a method using a collimator (see WO2019/167145).

SUMMARY OF THE INVENTION

The optical sensor sequentially irradiates the measuring object with light of a plurality of wavelength bands at intervals for sensing reflected light and transmitted light from the measuring object, thereby acquiring a plurality of types of information related to the measuring object. However, this manner requires a long time to acquire all of the plurality of types of information.

One or more embodiments of the present invention have been conceived in view of the above, and an object thereof is to provide an optical sensor capable of acquiring a plurality of types of information with a plurality of wavelengths in a short time.

An optical sensor according to an aspect of the present disclosure includes a light receiving part that includes a plurality of pixels disposed in a plane surface and receives light from a measuring object, an interposer that includes a plurality of through holes and is disposed on an upper side of the light receiving part such that one or plurality of the through holes overlap each of the pixels, a first wavelength selecting unit that transmits light in a first wavelength band and overlaps each of the plurality of through holes belonging to a first group, and a second wavelength selecting unit that transmits light in a second wavelength band and overlaps the plurality of through holes belonging to a second group, which is different from the first group.

According to the present disclosure, it is possible to obtain a plurality of types of information with a plurality of wavelengths in a short time.

DETAILED DESCRIPTION OF THE INVENTION

Embodiments of the present invention will be described below in detail with reference to the accompanying drawings. In this regard, the present invention is not to be limited to the embodiments described below, and can be changed as appropriate without departing from the spirit of the invention.

The accompanying drawings may schematically illustrate widths, thicknesses, shapes, or other characteristics of each part for clarity of illustration, compared to actual configurations. However, such a schematic illustration is merely an example and not intended to limit the present invention. In this specification and the drawings, some elements identical or similar to those shown previously are denoted by the same reference signs as the previously shown elements, and thus repetitive detailed descriptions of them may be omitted as appropriate.

Further, in the detailed description of the present invention, when a positional relationship between a component and another component is defined, if not otherwise stated, the words "on" and "below" suggest not only a case where the another component is disposed immediately on or below the component, but also a case where the component is disposed on or below the another component with a third component interposed therebetween.

First Embodiment

Figure 1:
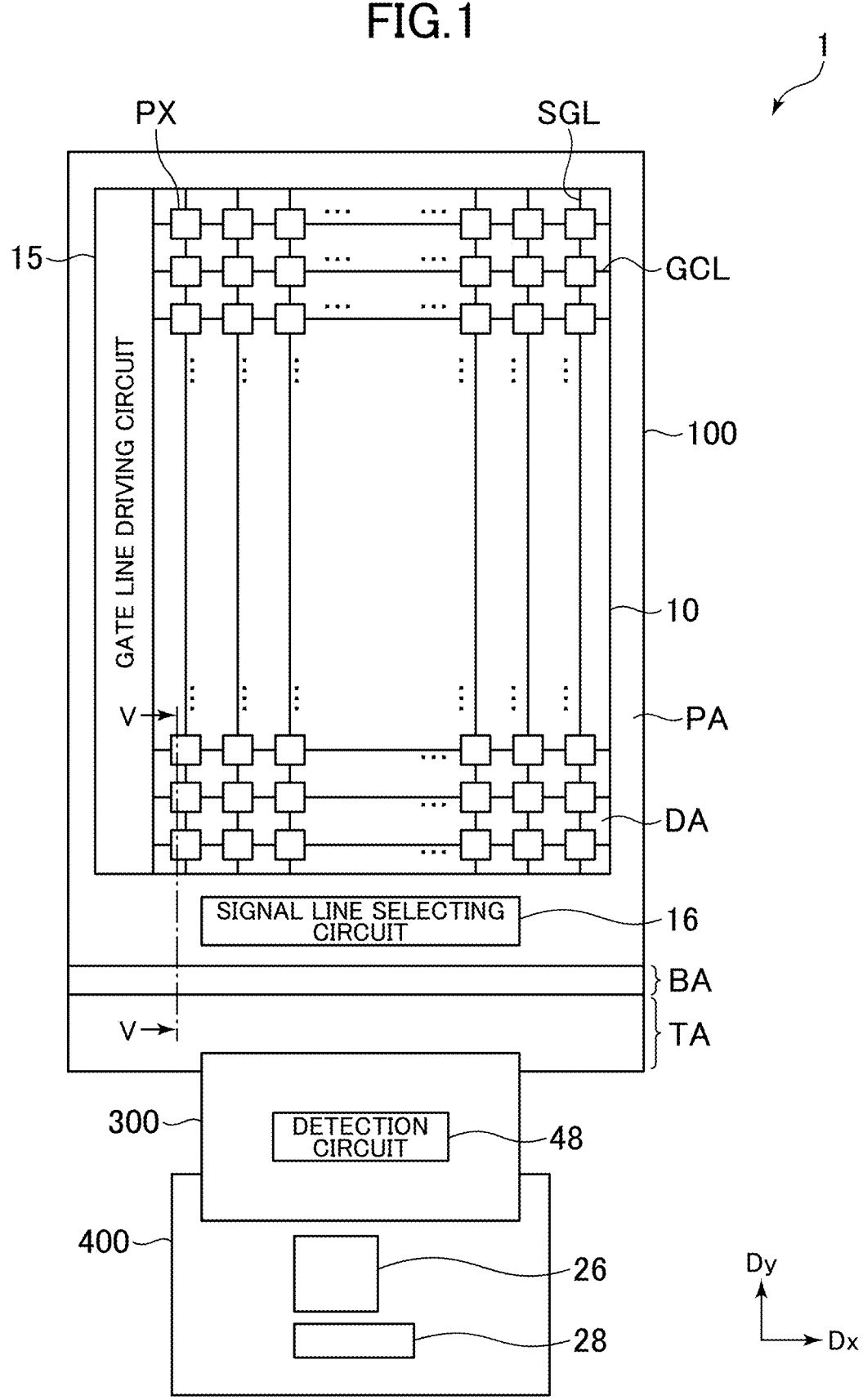
FIG. 1 is a schematic plan view of an optical sensor.

FIG. 1 is a schematic plan view of an optical sensor 1 according to the first embodiment of the present invention. As shown in FIG. 1, the optical sensor 1 includes a resin substrate 100, a light receiving part 10, a gate line driving circuit 15, a signal line selecting circuit 16, a control circuit 26, a power supply circuit 28, a detection circuit 48, a flexible printed substrate 300, and a control substrate 400.

The resin substrate 100 is electrically connected to a control substrate 400 via a flexible printed board 300. The detection circuit 48 is provided on the flexible printed substrate 300. The control substrate 400 includes the control circuit 26 and the power supply circuit 28. The control circuit 26 supplies a control signal to the light receiving part 10, the gate line driving circuit 15, and the signal line selecting circuit 16 to control the detection operation of the light receiving part 10. The detection circuit 48 and the control circuit 26 are ICs (Integrated Circuit) and FPGAS (Field Programmable Gate Array), for example. The power supply circuit 28 supplies power supply voltage to the light receiving part 10, the gate line driving circuit 15, and the signal line selecting circuit 16.

The resin substrate 100 includes a detection area DA and a frame area PA. The detection area DA is an area in which the light receiving part 10 is provided. The frame area PA is an area outside the detection area DA where the light receiving part 10 is not provided.

The frame area PA has a bending area BA and a terminal area TA. The bending area BA and the terminal area TA are provided at one end of the frame area PA. Wires connected to the detection area DA are disposed in the bending area BA and the terminal area TA. The resin substrate 100 and the flexible printed board 300 are connected to each other in the terminal area TA.

The light receiving part 10 includes a plurality of pixels PX arranged in a plane surface and receives light from measuring object. The pixels PX are arranged in a matrix in the detection area DA. The pixels PX include a photodiode 30 (see FIG. 4) and output an electric signal corresponding to light irradiated to each pixel PX. Each pixel PX outputs an electric signal, as a first detection signal Vdet, corresponding to the irradiated light to the signal line selecting circuit 16. Further, each pixel PX performs detection according to a gate drive signal Vgcl supplied from the gate line driving circuit 15.

The gate line driving circuit 15 and the signal line selecting circuit 16 are provided in the frame area PA. Specifically, the gate line driving circuit 15 is disposed, in the frame area PA, in an area extending along the extending direction (second direction Dy) of the signal line SGL. The signal line selecting circuit 16 is disposed, in the frame area PA, in an area extending along the extending direction (first direction Dx) of the gate line GCL, and is disposed between the light receiving part 10 and the bending area BA.

Figure 2:
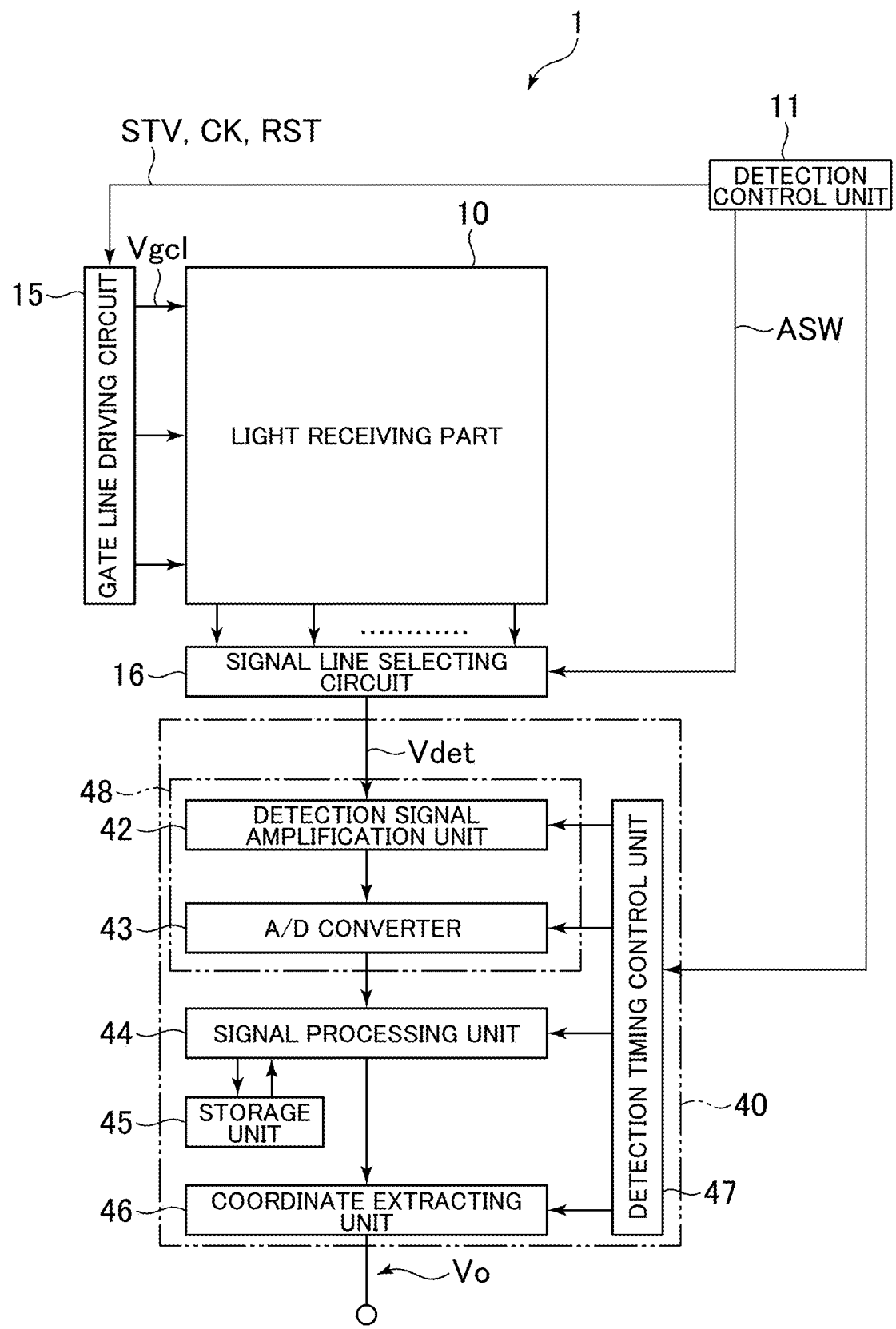
FIG. 2 is a block diagram showing an example of a configuration of the optical sensor.

FIG. 2 is a block diagram showing an example of a configuration of the optical sensor 1 according to the embodiment of the present invention. As shown in FIG. 2, the optical sensor 1 further includes a detection control unit 11 and a detection unit 40. Some or all of the functions of the detection control unit 11 are included in the control circuit 26. Further, some or all of the functions of the detection unit 40 are included in the control circuit 26.

The detection control unit 11 is a circuit that respectively supplies control signals to the gate line driving circuit 15, the signal line selecting circuit 16, and the detection unit 40, and controls these operations. The detection control unit 11 supplies control signals, such as a start signal STV, a clock signal CK, and a reset signal RST, to the gate line driving circuit 15. Further, the detection control unit 11 supplies control signals, such as a selection signal ASW, to the signal line selecting circuit 16.

The gate line driving circuit 15 is a circuit that drives the gate line GCL based on the control signals. The gate line driving circuit 15 sequentially or simultaneously selects a plurality of gate lines GCL and supplies a gate drive signal Vgcl to the selected gate lines GCL. This enables the gate line driving circuit 15 to select the pixel PX connected to the gate line GCL.

The signal line selecting circuit 16 is a switch circuit that sequentially or simultaneously selects a plurality of signal lines SGL. The signal line selecting circuit 16 is a multiplexer, for example. The signal line selecting circuit 16 connects the selected signal line SGL with the detection circuit 48 based on the selection signal ASW supplied from the detection control unit 11. This enables the signal line selecting circuit 16 to output the first detection signal Vdet of the pixel PX to the detection unit 40.

The detection unit 40 includes a signal processing unit 44, a storage unit 45, a coordinate extracting unit 46, a detection timing control unit 47, and a detection circuit 48. The detection timing control unit 47 controls the signal processing unit 44, the coordinate extracting unit 46, and the detection circuit 48 to operate in synchronization based on the control signal supplied from the detection control unit 11.

The detection circuit 48 is an analog front-end (AFE) circuit, for example. The detection circuit 48 is a signal processing circuit having at least the functions of a detection signal amplification unit 42 and an A/D converter 43. The detection signal amplification unit 42 amplifies the first detection signal Vdet. The A/D converter 43 converts an analog signal from the detected signal amplification unit 42 into a digital signal.

The signal processing unit 44 is a logic circuit that detects a predetermined physical quantity entered into the light receiving part 10 based on the output signal of the detection circuit 48. When a finger Fg comes into contact with or approaches the detection surface, the signal processing unit 44 can detect the unevenness of the surface of the finger Fg or the palm based on a signal from the detection circuit 48. Further, the signal processing unit 44 can detect information on a living body based on a signal from the detection circuit 48. The information on the living body is, for example, a blood vessel image of the finger Fg and the palm, a pulse wave, a pulse, and a blood oxygen saturation. Further, the signal processing unit 44 calculates a signal $\Delta V$ of the difference between the first detection signal Vdet and the second detection signal Vdet-R.

The storage unit 45 temporarily stores the signal calculated by the signal processing unit 44. Further, the storage unit 45 stores information about the first detection signal Vdet, the second detection signal Vdet-R, and the signal $\Delta V$ of the difference in the past. The storage unit 45 may be a random access memory (RAM) or a register circuit, for example.

The coordinate extracting unit 46 is a logic circuit that obtains detection coordinates of unevenness on the surface of the finger Fg when the signal processing unit 44 detects a contact or an approach of the finger Fg. The coordinate extracting unit 46 is a logic circuit that obtains detection coordinates of a finger Fg or a blood vessel of a palm. The coordinate extracting unit 46 combines the first detect signals Vdet output from the respective photodiodes 30 of the light receiving part 10 to generate two-dimensional data indicating the shapes of the unevennesses on the surface of the finger Fg, for example. The coordinate extracting unit 46 may output the first detection signal Vdet and the second detection signal Vdet-R as a sensor output Vo without calculating the detection coordinates.

Figure 3:
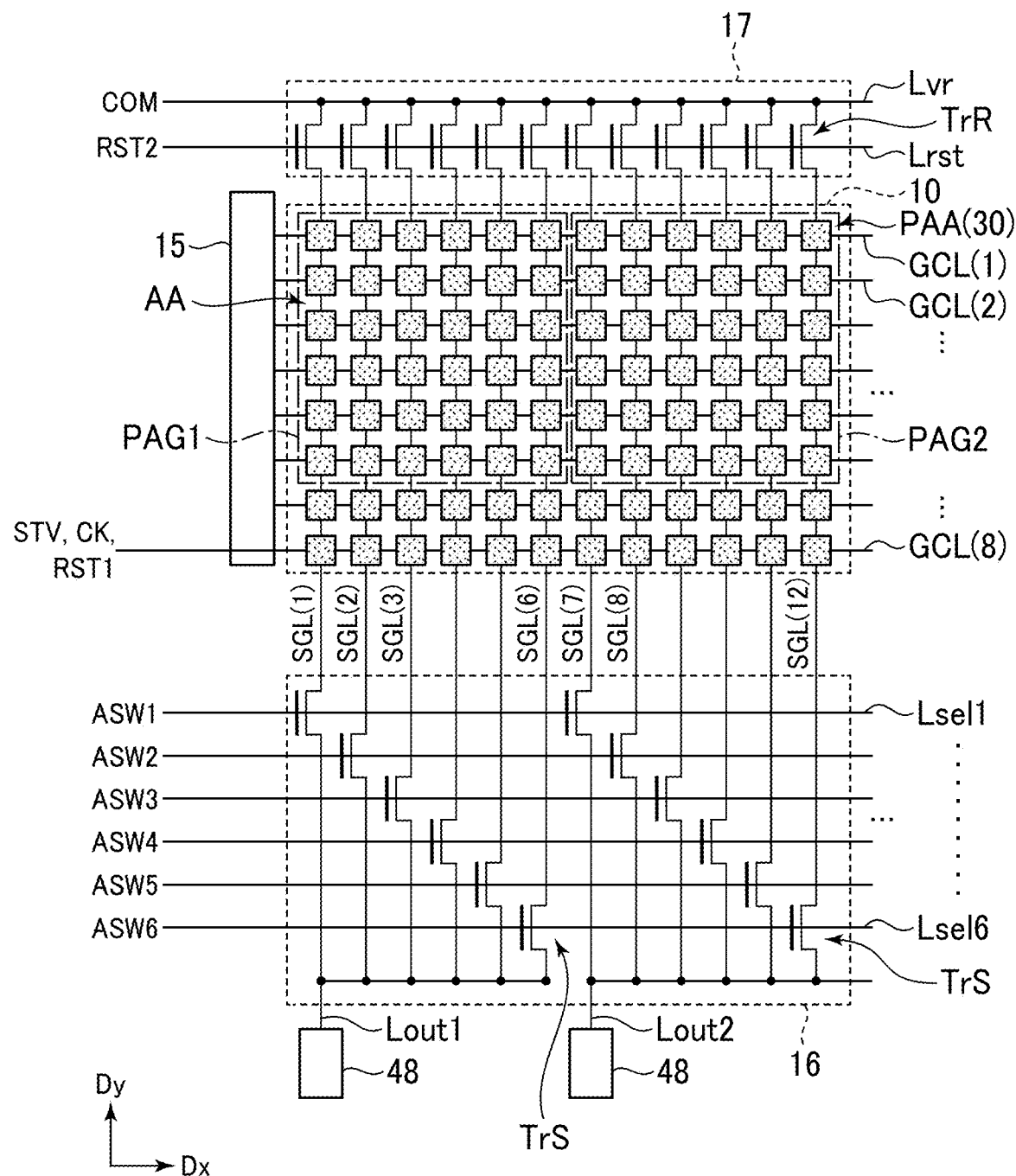
FIG. 3 is a circuit diagram of the optical sensor.
Figure 4:
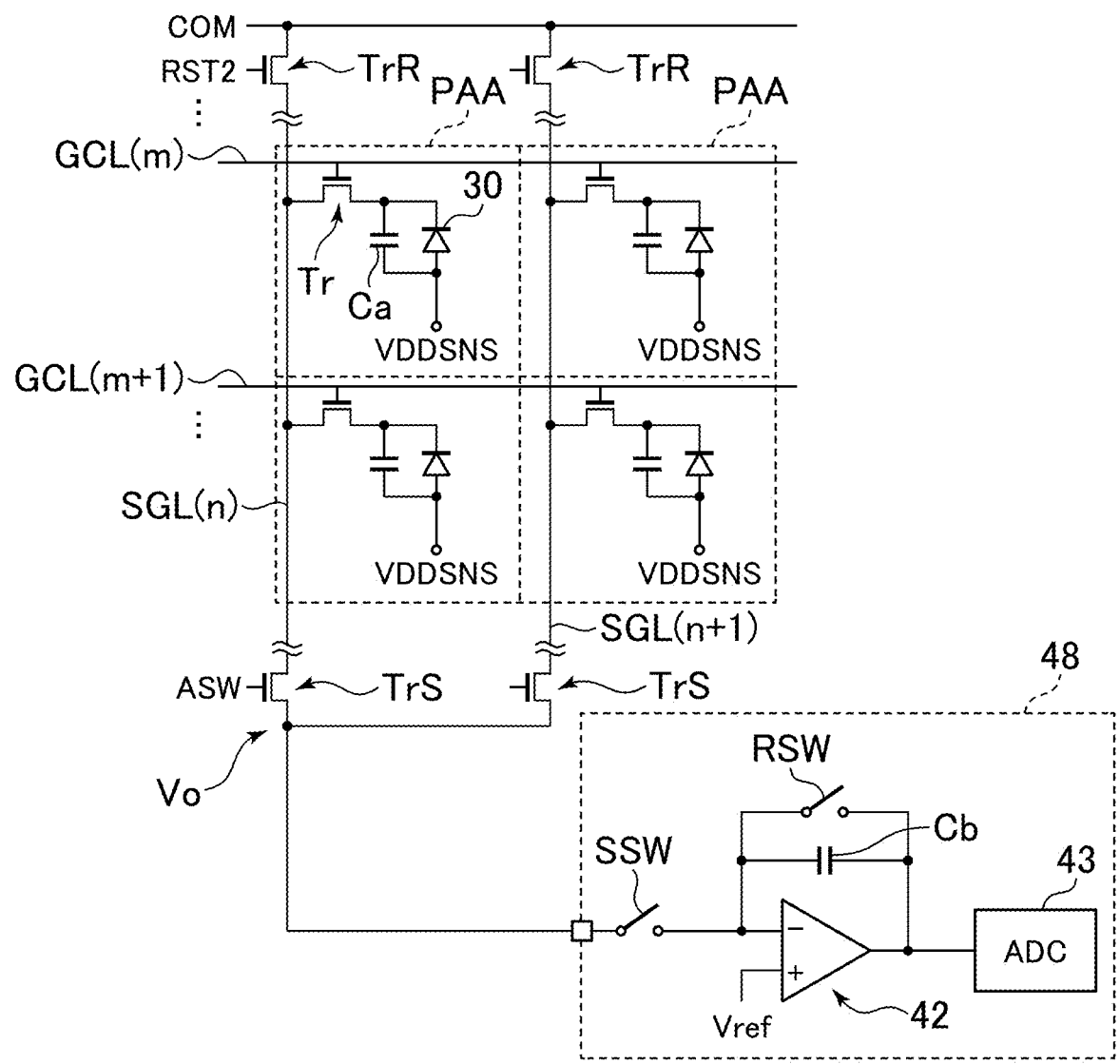
FIG. 4 is a circuit diagram of a part of a detection area.

Next, examples of a circuit configuration and an operation of the optical sensor 1 will be described. FIG. 3 is a circuit diagram of the optical sensor. FIG. 4 is a circuit diagram of a part of the detection area. FIG. 4 also shows the circuit configuration of the detection circuit 48.

As shown in FIG. 3, the light receiving part 10 includes a plurality of partial detection areas PAA arranged in a matrix. Each of the partial detection areas PAA includes a photodiode 30.

The gate line GCL extends in the first direction Dx and is connected to the plurality of partial detection areas PAA arranged in the first direction Dx. Further, the gate lines GCL(1), GCL(2), . . . and GCL(8) are arranged in the second direction Dy and connected to the gate line driving circuit 15. In the following description, when it is not necessary to separately describe the gate lines GCL(1), GCL(2), . . . and GCL(8), they are simply referred to as gate lines GCL. For purposes of illustrative clarity, FIG. 3 shows eight gate lines GCL, which is merely an example, and the gate lines GCL may be M lines (M is 8 or more, e.g., M=256).

The signal line SGL extends in the second direction Dy and is connected to the photodiodes 30 of the plurality of partial detection areas PAA arranged in the second direction Dy. Further, the plurality of signal lines SGL(1), SGL(2), . . . and SGL(12) are arranged in the first direction Dx and connected to the signal line selecting circuit 16 and the reset circuit 17. In the following description, when it is not necessary to separately describe the signal lines SGL(1), SGL(2), . . . and SGL(12), the signal lines SGL are simply referred to as signal lines SGL.

For purposes of illustrative clarity, twelve signal lines SGL are shown, but this is merely an example and the signal lines SGL may be N lines (N is equal to or greater than 12, e.g., N=252). For example, the resolution of the sensor is 508 dpi (dot per inch), and the cell count is 252×256. In FIG. 3, the light receiving part 10 is disposed between the signal line selecting circuit 16 and the reset circuit 17. Without being limited thereto, the signal line selecting circuit 16 and the reset circuit 17 may be connected to the end of the signal line SGL in the same direction.

The gate line driving circuit 15 receives control signals such as the start signal STV, the clock signal CK, and the reset signal RST1 from the detection control unit 11. The gate line driving circuit 15 sequentially selects a plurality of gate lines GCL(1), GCL(2), . . . and GCL(8) in a time-division manner based on the control signals. The gate line driving circuit 15 supplies the gate drive signal Vgcl to the selected gate line GCL. In this manner, the gate drive signal Vgcl is supplied to a plurality of first switching elements Tr connected to the gate line GCL, and the plurality of partial detection areas PAA arranged in the first direction Dx are selected as detection targets.

The gate line driving circuit 15 may perform different driving for each detection mode of a fingerprint and the detection of different items of biological information (e.g., pulse wave, pulse, blood vessel image, blood oxygen saturation). For example, the gate line driving circuit 15 may drive a plurality of gate lines GCL collectively.

Specifically, the gate line driving circuit 15 may simultaneously select a predetermined number of gate lines GCL among the gate lines GCL(1), GCL(2), . . . and GCL(8) based on the control signal. For example, the gate line driving circuit 15 may simultaneously select gate lines GCL(1) to (6) and supplies thereto the gate-drive-signal Vgcl. The gate line driving circuit 15 supplies the gate drive signals Vgcl to the plurality of first switching elements Tr through the selected six gate lines GCL. In this manner, the group areas PAG1 and PAG2 each including the plurality of partial detection areas PAA arranged in the first direction Dx and the second direction Dy are selected as the detection targets. The gate line driving circuit 15 collectively drives a predetermined number of gate lines GCL, and sequentially supplies the gate drive signals Vgcl to each predetermined number of gate lines GCL. In the following, when the positions of the different group areas such as the group areas PAG1 and PAG2 are not particularly distinguished from each other, each of the group areas are called group area PAG.

The signal line selecting circuit 16 includes a plurality of selection signal lines Lsel, a plurality of output signal lines Lout, and second switching elements TrS. The plurality of second switching elements TrS are provided so as to respectively correspond to the signal lines SGL. Six signal lines SGL(1), SGL(2), . . . and SGLs (6) are connected to a common output signal line Lout1. Six signal lines SGL(7), SGL(8), . . . and SGL(12) are connected to a common output signal line Lout2. The output signal lines Lout1 and Lout2 are connected to the detection circuit 48.

The signal lines SGL (1), SGL (2), . . . and SGL (6) are grouped into a first signal line block, and the signal lines SGL (7), SGL (8), . . . and SGL (12) are grouped into a second signal line block. The selection signal lines Lsel are respectively connected to the gates of the second switching elements Trs included in one of the signal line blocks. One of the selection signal lines Lsel is connected to the gates of the second switching elements TrS in the signal line blocks.

Specifically, the selection signal lines Lsel1, Lsel2, . . . and Lsel6 are connected to the second switching elements TrS respectively corresponding to the signal lines SGL(1), SGL(2), . . . and SGL(6). The selection signal line Lsel1 is connected to the second switching element TrS corresponding to the signal line SGL(1) and the second switching element Trs corresponding to the signal line SGL(7). The selection signal line Lsel2 is connected to the second switching element Trs corresponding to the signal line SGL(2) and the second switching element TrS corresponding to the signal line SGL(8).

The detection control unit 11 sequentially supplies the selection signal ASW to the selection signal lines Lsel. Through the operations of the second switching elements TrS, the signal line selecting circuit 16 sequentially selects the signal lines SGL in one of the signal line blocks in a time-division manner. The signal line selecting circuit 16 selects one of the signal lines SGL in each of the signal line blocks. With such a configuration, the optical sensor 1 can reduce the number of ICs (Integrated Circuit) including the detection circuit 48 or the number of terminals of the ICs.

The signal line selecting circuit 16 may collectively connect the signal lines SGL with the detection circuit 48. Specifically, the detection control unit 11 simultaneously supplies the selection signal ASW to the selection signal lines Lsel. With this operation, the signal line selecting circuit 16 selects a plurality of signal lines SGL(e.g., six signal lines SGL) in one of the signal line blocks by the operation of the second switching element TrS, and connects the signal lines SGL with the detection circuit 48. As a result, a signal detected in each group region PAG is output to the detection circuit 48. In this case, signals from the partial detection areas PAA (photodiodes 30) are put together per group area PAG and output to the detection circuit 48.

The gate line driving circuit 15 and the signal line selecting circuit 16 operate to perform the detection for each group area PAG. This also reduces the time required for the detection. As such, the optical sensor 1 can repeatedly perform the detection in a short time, and thus, can improve the S/N ratio and accurately detect a change in the biological information, such as the pulse wave, with time.

The reset circuit 17 includes a reference signal line Lvr, a reset signal line Lrst, and third switching elements TrR. The third switching elements TrR correspond to the plurality of signal lines SGL. The reference signal line Lvr is connected to either the sources or the drains of the third switching elements TrR. The reset signal line Lrst is connected to the gates of the third switching elements TrR.

The detection control unit 11 supplies the reset signal RST2 to the reset signal line Lrst. This turns on the third switching elements TrR to electrically connect the signal lines SGL to the reference signal line Lvr. The power supply circuit 28 supplies a reference signal COM to the reference signal line Lvr. This operation supplies the reference signal COM to an additional capacitance Cad (see FIG. 4) included in the partial detection areas PAA.

As shown in FIG. 4, each of the partial detection areas PAA includes a photodiode 30, an additional capacitance Cad, and a first switching element Tr. FIG. 4 shows two gate lines GCL(m) and GCL(m+1) arranged in the second direction Dy among the plurality of gate lines GCL. FIG. 4 also shows two signal lines SGL(n) and SGL(n+1) arranged in the first direction Dx among the plurality of signal lines SGL. The partial detection area PAA is an area surrounded by the gate line GCL and the signal line SGL. The first switching element Tr corresponds to the photodiode 30. The first switching element Tr is composed of a thin film transistor TFT (see FIG. 5), and in this embodiment, includes an n-channel MOS (metal oxide semiconductor) type TFT.

The gates of the first switching elements Tr belonging to the partial detection areas PAA arranged in the first direction Dx are connected to the gate line GCL. The sources of the first switching elements Tr belonging to the partial detection areas PAA arranged in the second direction Dy are connected to the signal line SGL. The drain of the first switching element Tr is connected to the cathode of the photodiode 30 and the additional capacitance Cad.

The power supply circuit 28 supplies the sensor power supply signal VDDSNS to the anode of the photodiode 30. Further, the power supply circuit 28 supplies the reference signal COM, which is the initial potential of the signal line SGL and the additional capacitance Cad, to the signal line SGL and the additional capacitance Cad.

When the partial detection area PAA is irradiated with light, a current corresponding to the amount of the light flows through the photodiode 30, whereby electric charges are accumulated in the additional capacitance Cad. When the first switching element Tr is turned on, a current flows through the signal line SGL in accordance with the charges accumulated in the additional capacitance Cad. The signal line SGL is connected to the detection circuit 48 via the second switching element TrS of the signal line selecting circuit 16. This allows the optical sensor 1 to detect a signal corresponding to the amount of light irradiated to the photodiode 30 for each partial detection area PAA or for each group area PAG.

The detection signal amplification unit 42 of the detection circuit 48 converts a variation of a current supplied from the signal lines SGL into a variation of a voltage, and amplifies the result. A reference potential Vref having a fixed potential is supplied to the non-inverting input unit (+) of the detection signal amplification unit 42. The signal line SGL is connected to the inverting input terminal (−) when the output switch SSW is in the ON state. The same signal as the reference signal COM is supplied as a reference potential Vref. The detection signal amplification unit 42 includes a capacitive element Cb and a reset switch RSW. When the signal reading for one row is completed, the reset switch RSW is turned on, and an electrical charge of the capacitive element Cb is reset.

Figure 5:
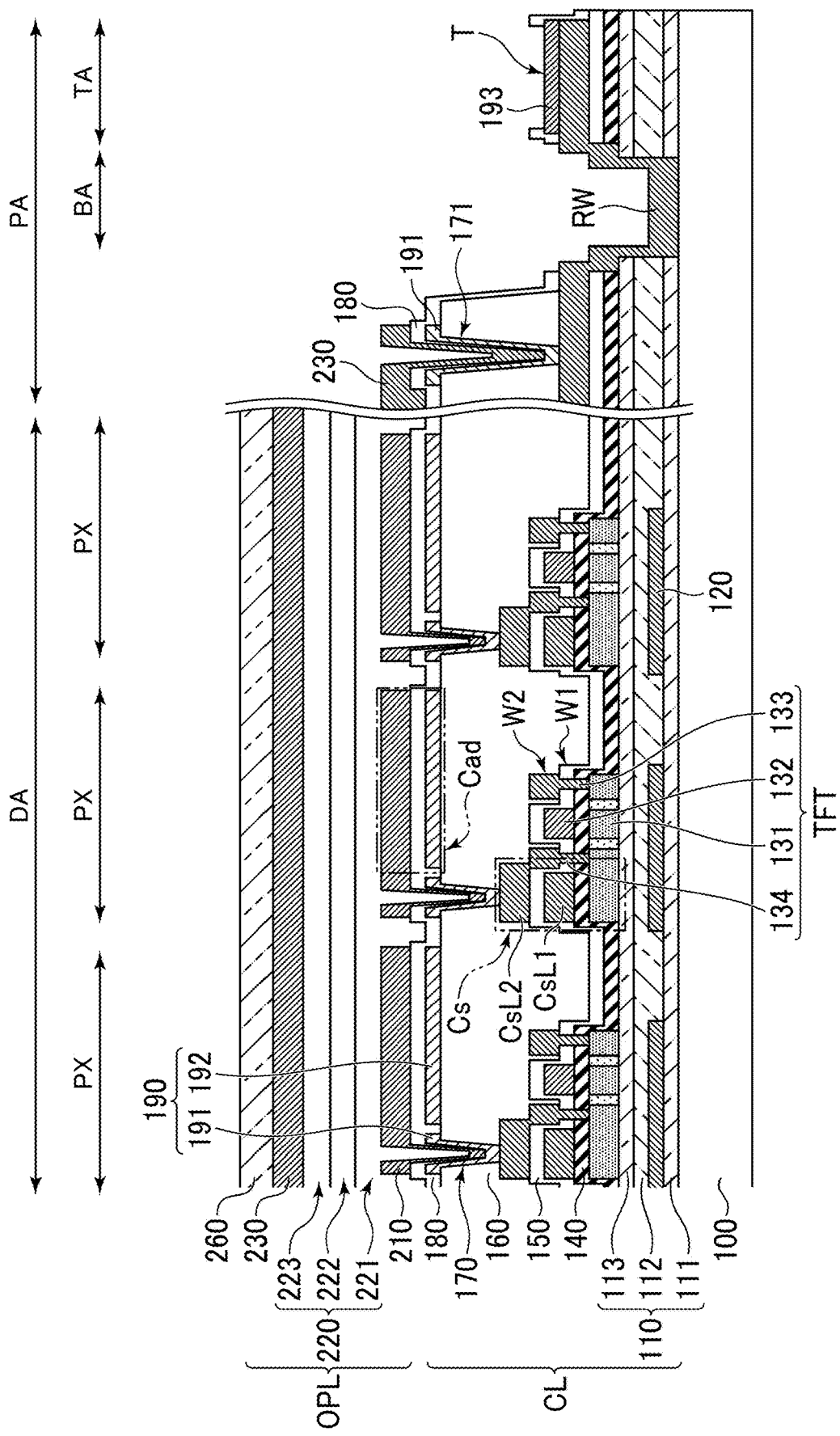
FIG. 5 is a partial sectional view of the optical sensor taken along the line V-V of FIG. 1.

Next, a cross-sectional configuration of the optical sensor 1 will be described. FIG. 5 is a partial sectional view of the optical sensor 1 taken along the line V-V of FIG. 1 in the first embodiment. In FIG. 5, an interposer 600 (described later) is omitted. In FIG. 5, a part of the detection area DA and a part of the frame area PA are shown in a cross-sectional view. As described above, the detection area DA includes a plurality of pixels PX, and the frame area PA includes the bending area BA and the terminal area TA. Each pixel PX includes a corresponding one of electrodes 210 and a corresponding one of the thin film transistors TFT. A circuit layer CL includes layers from a barrier inorganic film 110 to an inorganic insulating film 180, and an organic photoelectric conversion layer OPL includes layers from a lower electrode 210 to an upper electrode 230.

FIG. 5 shows the cross section in the second direction Dy, although in the detection area DA, if the optical sensor is cut in the first direction Dy, the same cross-sectional structure as in FIG. 4 is seen. In FIG. 5, hatching is omitted in some layers to facilitate a view of the cross-sectional structure.

In the following, the laminated structure of layers from the resin substrate 100 to the sealing film 260 will be described in order from the lower layer. First, the circuit layer CL provided on the resin substrate 100 will be described.

A barrier inorganic film 110 is laminated on the resin substrate 100. The resin substrate 100 is made of polyimide. In this regard, if the resin substrate 100 has sufficient flexibility as the sheet-type optical sensor optical sensor, any resin material may be used. The barrier inorganic film 110 has a three-layer structure of a first inorganic film 111 (e.g., silicon oxide film), a second inorganic film 112 (e.g., silicon nitride film), and a third inorganic film 113 (e.g., silicon oxide film). The first inorganic film 111 is provided to improve the adhesion to the substrate, the second inorganic film 112 is provided to block moisture and impurities from the outside, and the third inorganic film 113 is provided to prevent hydrogen atoms contained in the second inorganic film 112 from diffusing to the semiconductor layer 131, but the structure is not particularly limited thereto. The structure may include an additional layer, or may be formed of one layer or two layers.

An additional film 120 may be formed at a portion where the thin film transistor TFT to be described later is formed. The additional film 120 prevents a change in characteristics of the thin film transistor TFT due to penetration of light from the back surface of the channel of the thin film transistor TFT or provides a predetermined potential by being formed of a conductive material, thereby providing a back gate effect to the thin film transistor TR. Here, after the first inorganic film 111 is formed, the additional film 120 is formed in an island shape in accordance with the portion where the thin film transistor TFT is formed, and then the second inorganic film 112 and the third inorganic film 113 are laminated, so that the additional film 120 is sealed in the barrier inorganic film 110. Without being limited thereto, after the additional film 120 is formed, the barrier inorganic film 110 may be formed.

A thin film transistor TFT is formed on the barrier inorganic film 110 for each pixel PX. The thin film transistor TFT includes a semiconductor layer 131, a gate electrode 132, a source electrode 133, and a drain electrode 134. Here, a polysilicon thin film transistor is taken as an example, and only an Nch transistor is shown, although a Pch transistor may also be formed. The semiconductor layer 131 of the thin film transistor TFT has a structure in which a low-concentration impurity region or an intrinsic semiconductor region is provided between a channel region and a source/drain region. The gate electrode 132 is a portion where the gate line GCL is electrically connected to the semiconductor layer 131 in each pixel PX. Similarly, the source electrode 133 is a portion where the signal line SGL is electrically connected to the semiconductor layer 131 in each pixel PX.

A gate insulating film 140 is provided between the semiconductor layer 131 and the gate electrode 132. Here, a silicon oxide film is used as the gate insulating film 140. The gate electrode 132 is a part of the first wiring layer W1 formed of MoW. The first wiring layer W1 includes a first holding capacitance line CsL1 in addition to the gate electrode 132. A part of the holding capacitor Cs is formed between the first holding capacitance line CsL1 and the semiconductor layer 131 (source/drain regions) via the gate insulating film 140.

An interlayer insulating film 150 is formed on the gate electrode 132. The interlayer insulating film 150 has a structure in which a silicon nitride film and a silicon oxide film are laminated. The films from the barrier inorganic film 110 to the interlayer insulating film 150 are patterned and removed at the area corresponding to the bending area BA. The polyimide forming the resin substrate 100 is exposed in the area corresponding to the bending area BA. When the barrier inorganic film 110 is patterned to be removed, the surface of the polyimide may be partially eroded or lost.

A wiring pattern is formed under each of the step at the edge of the interlayer insulating film 150 and the step at the edge of the barrier inorganic film 110. A routing wire RW is disposed over the wiring pattern when crossing the steps. For example, the gate electrode 132 is disposed between the interlayer insulating film 150 and the barrier inorganic film 110, and the additional film 120 is disposed between the barrier inorganic film 110 and the resin substrate 100. As such, the wiring pattern is formed using these layers.

A second wiring layer W2, which includes the source electrode 133, the drain electrode 134, and a portion serving as the routing wire RW, is formed on the interlayer insulating film 150. Here, a three-layered structure of Ti, Al, and Ti is employed. The first holding capacitance line CsL1 (a part of the first wiring layer W1) and the second holding capacitance line CsL2 (a part of the second wiring layer W2) form another part of the holding capacitor Cs via the interlayer insulating film 150. The routing wire RW extends to the terminal area TA via the bending area BA and forms a terminal portion T to which the flexible printed substrate 300 is connected, for example.

The routing wire RW is formed so as to reach the terminal portion T across the bending area BA, and thus crosses the steps of the interlayer insulating film 150 and the barrier inorganic film 110. As described above, the wiring pattern formed by the additional film 120, for example, is formed in the steps. As such, even if the routing wire RW is disconnected at the recess of the step, the electrical connection can be maintained by contacting the wiring pattern.

A flattening film 160 is disposed so as to cover the source electrode 133, the drain electrode 134, and the interlayer insulating film 150. The flattening film 160 is made of resin, such as photosensitive acryl, because such a material is superior in surface flatness to an inorganic insulating material formed by CVD (chemical vapor deposition), for example. The flattening film 160 is removed in a pixel contact portion 170, an upper electrode contact portion 171, the bending area BA, and the terminal area TA.

A transparent conductive film 190 made of indium tin oxide (ITO) is formed on each pixel PX on the flattening film 160. The transparent conductive film 190 includes a first transparent conductive film 191 and a second transparent conductive film 192, which are separated from each other.

In the pixel contact portion 170, the first transparent conductive film 191 is electrically connected to the second wiring layer W2, a surface of which is exposed by removal of the flattening film 160. The second transparent conductive film 192 is disposed below a lower electrode 210 (further below the inorganic insulating film 180) to be described later and next to the pixel contact portion 170. The inorganic insulating film 180 (silicon nitride film) is disposed on the transparent conductive film 190 and the flattening film 160 so as to cover the first transparent conductive film 191 except for the opening of the pixel contact portion 170.

The second transparent conductive film 192, the inorganic insulating film 180, and the lower electrode 210 overlap each other in a plan view and whereby the additional capacitance Cad is formed.

The transparent conductive film 190 may also be formed on the surface of the terminal portion T to serve as a third transparent conductive film 193. The third transparent conductive film 193 formed on the surface of the terminal portion T may be provided for the purpose of protecting the exposed wiring portion from a damage in a process subsequent to forming the third transparent conductive film 193.

A lower electrode 210 is provided for each pixel PX on the inorganic insulating film 180 so as to be electrically connected to the drain electrode 134 through the opening of the inorganic insulating film 180 in the pixel contact portion 170. The lower electrode 210 is formed as a reflective electrode and has a three-layer structure of an indium zinc oxide film, an Ag film, and an indium zinc oxide film. An indium tin oxide film may be used instead of the indium zinc oxide film. The lower electrode 210 extends laterally from the pixel contact portion 170 and above the thin film transistor TFT.

An organic material layer 220 is disposed on the lower electrode 210. The organic material layer 220 includes, in order from the bottom, a lower carrier transport layer 221, an organic light-receiving layer 222, and an upper carrier transport layer 223. When the front surface irradiation structure is employed, the lower carrier transport layer 221 is an electron transport layer and the upper carrier transport layer 223 is an electron transport layer. The organic light-receiving layer 222 may be formed by vapor deposition or by coating on a solvent dispersion. Here, the organic light-receiving layer 222 is formed over the entire surface covering the detection area DA, but not limited thereto.

The upper electrode 230 is formed in common to the pixels PX on the organic material layer 220. When the front surface irradiation structure is employed, the upper electrode 230 needs to be transparent. Here, PEDOT: PSS is formed on the surface in contact with the organic material layers 220, and then the upper electrode 230 is formed using a metallic material, such as Ag and Al, as a thin film that allows incident light to transmit. The upper electrode 230 is formed over the organic material layer 220 disposed on the detection area DA and the upper electrode contact portion 171 disposed on the frame area PA. The upper electrode 230 is electrically connected to the routing wire RW of the second wiring layer W2 in the upper electrode contact portion 171, and eventually extracted to the terminal portion T.

The sealing film 260 is formed on the upper electrode 230. One of the functions of the sealing film 260 is to protect the organic material layer 220 from moisture entering from the outside, and is required to have a high gas barrier property. Here, the sealing film 260 has a laminate structure including a silicon nitride film, and includes a silicon nitride film, an organic resin, and a silicon nitride film. A silicon oxide film or an amorphous silicon layer may be provided between the silicon nitride film and the organic resin to improve adhesion. However, such a film is provided on the light-receiving surface side, it is thus preferable that the materials do not absorb or otherwise act on light of the wavelength to be detected.

If necessary, a cover member 1300 (see FIG. 13) may be provided on the sealing film 260. In this case, an adhesive film may be disposed between the cover glass and the sealing film 26 as a filler made of a resin, for example, in order to fill the gap therebetween. The cover member 1300 is preferably made of a material that does not absorb light of a wavelength to be detected.

Figure 6A:
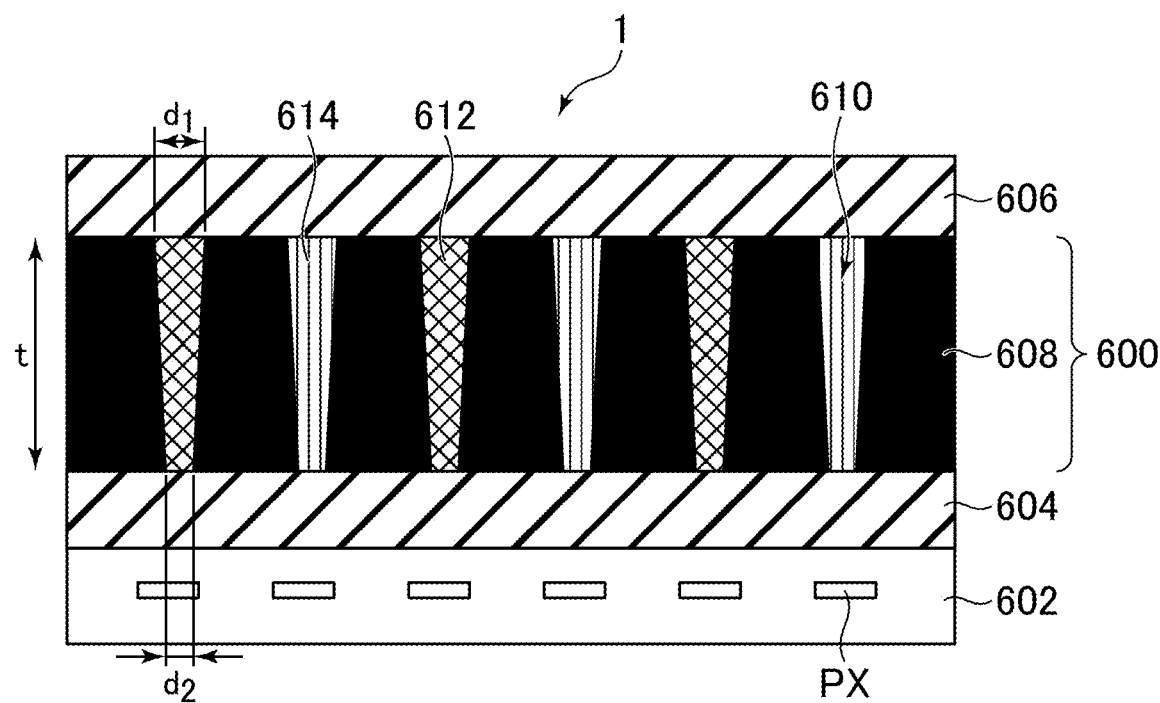
FIG. 6A is a schematic cross-sectional view of the optical sensor according to the first embodiment.
Figure 6B:
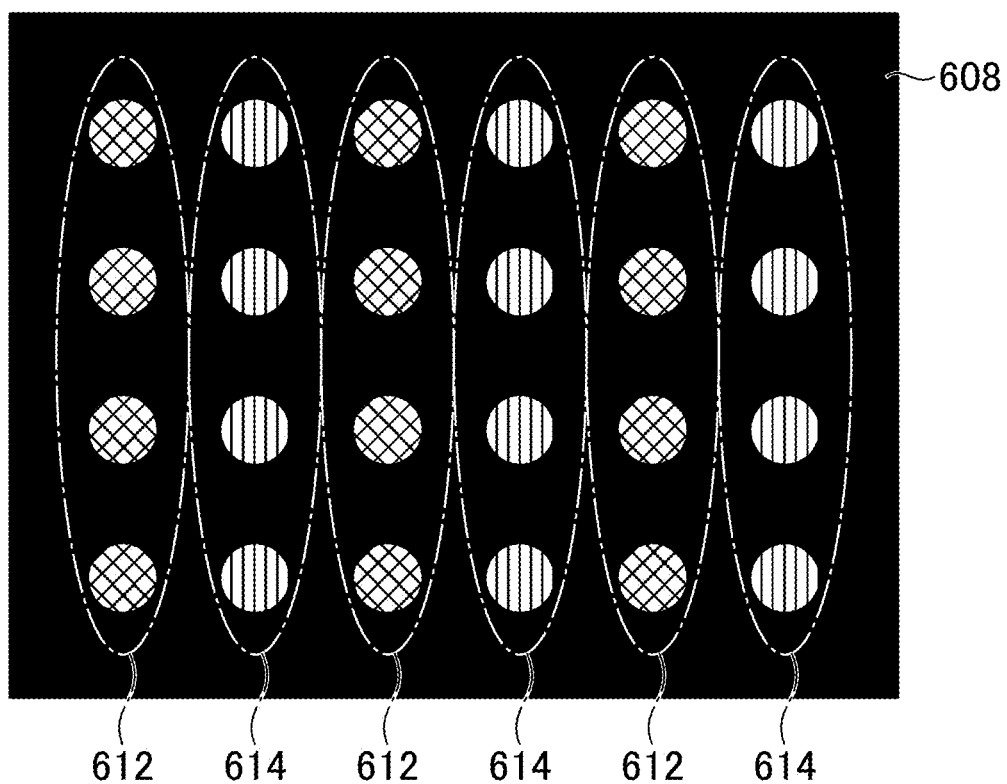
FIG. 6B is a schematic view of an upper surface of the optical sensor according to the first embodiment.

Next, the interposer 600 will be described. FIG. 6A is a schematic cross-sectional view of the optical sensor 1 according to the first embodiment. FIG. 6B is a schematic view of an upper surface of the optical sensor 1 according to the first embodiment. FIGS. 6A and 6B show the pixel area of four columns and six rows of the light receiving unit extracted from FIG. 3. As shown in FIGS. 6A and 6B, the optical sensor 1 includes a sensor unit 602, an interposer 600, and a first adhesive film 604, and a second adhesive film 606.

The sensor unit 602 includes the resin substrate 100 to the sealing film 260 shown in FIG. 5. FIGS. 6A and 6B do not show the layers shown in FIG. 5 and show only the pixels PX so as to easily recognize the positional relation between the through hole 610 and the pixels PX of the interposer 600.

The first adhesive film 604 and the second adhesive film 606 are optical clear adhesives (OCA), for example. The first adhesive film 604 is provided on the sealing film 260 to cover the sealing film 260. The second adhesive layer 606 is disposed on the upper side of the interposer 600 to cover the interposer 600. The first adhesive film 604 and the second adhesive film 606 each are made of a material that transmits the entire wavelength region of visible light and near-infrared light.

The interposer 600 includes a plurality of through holes 610 and is disposed on the upper side of the light receiving portion such that one or more through holes 610 overlap the respective pixels PX. Specifically, for example, the interposer 600 includes a light shielding portion 608, the through holes 610, a first wavelength selecting unit 612, and a second wavelength selecting unit 614. Specifically, the light shielding portion 608 is made of a material that does not transmit visible light. The thickness of the light shielding portion 608 is 125 μm, for example.

The through holes 610 are provided to penetrate through the interposer 600. The size of the opening of each through hole 610 is 30 μm to 50 μm, for example. The distance between the adjacent through holes 610 is 75 μm to 100 μm, for example. The size d2 of the opening of the through hole 610 on the light-receiving portion side (i.e., on the first adhesive film 604 side) is preferably smaller than the size d1 of the opening on the opposite side (i.e., on the second adhesive film 606 side). The aspect ratio obtained by dividing the thickness t of the interposer 600 by the average value of the size d2 of the opening on the first adhesive film 604 side and the size d1 of the opening on the second adhesive film 606 side is 1 or more, preferably 2 to 20.

The through holes 610 are arranged in a matrix and include those belonging to a first group and those belonging to a second group. The first group and the second group are disposed in a plane. Specifically, as shown in FIG. 6B, the through holes 610 are disposed one by one on the upper side of the respective pixels PX arranged in a matrix. The through holes 610 in the odd rows belong to the first group, and the through holes 610 in the even rows belong to the second group.

The first wavelength selecting units 612 are provided so as to transmit light in the first wavelength band and respectively overlap with the through holes 610 belonging to the first group. The second wavelength selecting units 614 are provided so as to transmit light in the second wavelength band and respectively overlap with the through holes 610 belonging to the second group, which is different from the first group. Specifically, for example, the first wavelength selecting unit 612 and the second wavelength selecting unit 614 are resins disposed inside the through holes 610. The first wavelength selecting unit 612 is a resin filled in the through hole 610 belonging to the first group, and transmits only light in the first wavelength band (e.g., 640 nm to 680 nm centered on 660 nm). The second wavelength selecting unit 614 is a resin filled in the through hole 610 belonging to the second group, and transmits only light in the second wavelength band (e.g., 830 nm to 870 nm centered on 850 nm).

Figure 7:
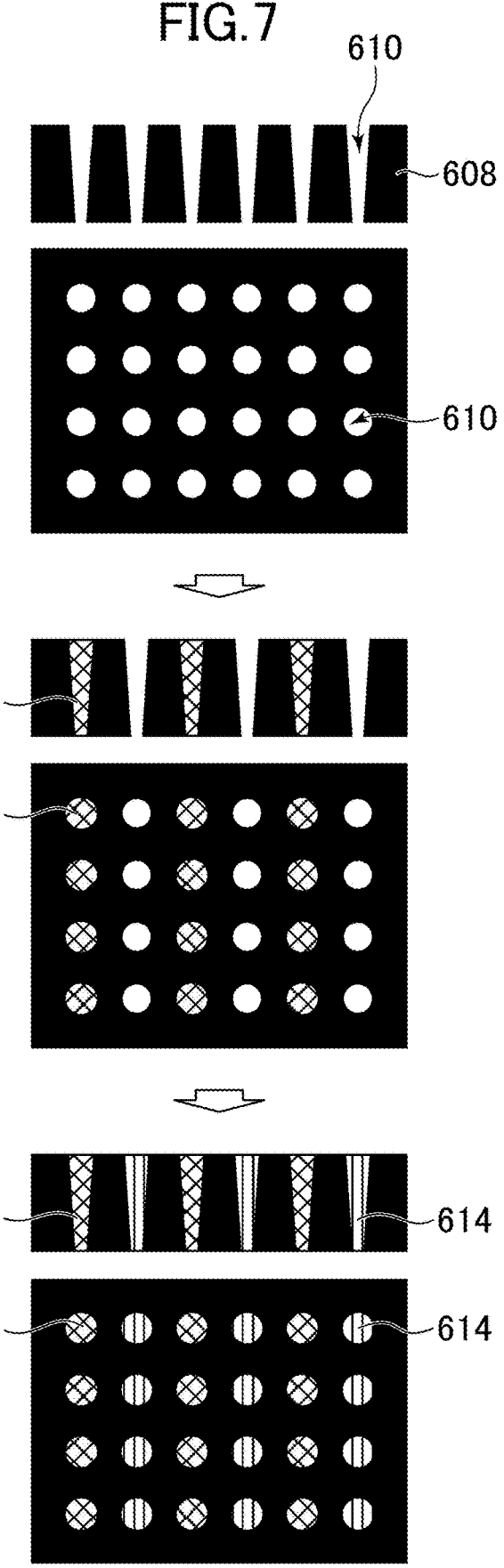
FIG. 7 is a diagram illustrating a manufacturing method of an interposer according to the first embodiment.

Next, referring to FIG. 7, a method of manufacturing the interposer 600 will be described. A light shielding film corresponding to the size of the detection area DA is prepared. When the light shielding film is disposed in the sensor unit 602, the through holes 610 are formed at positions overlapping with the respective pixels PX of the light shielding film. At this time, the through holes 610 belonging to the first group and the through holes 610 belonging to the second group are formed at the same time.

The through hole 610 belonging to the first group is filled with a resin that is to be the first wavelength selecting unit 612. For example, the through hole 610 belonging to the first group is filled with a resin that transmits only light in the first wavelength band (e.g., 640 nm to 680 nm centered on 660 nm).

The through hole 610 belonging to the second group is then filled with a resin that is to be the second wavelength selecting unit 614. For example, the through hole 610 belonging to the second group is filled with a resin that transmits only light in the second wavelength band (e.g., 830 nm to 870 nm centered on 850 nm). The processes of filling the first wavelength selecting unit 612 and the second wavelength selecting unit 614 can be performed in any order.

Figure 8:
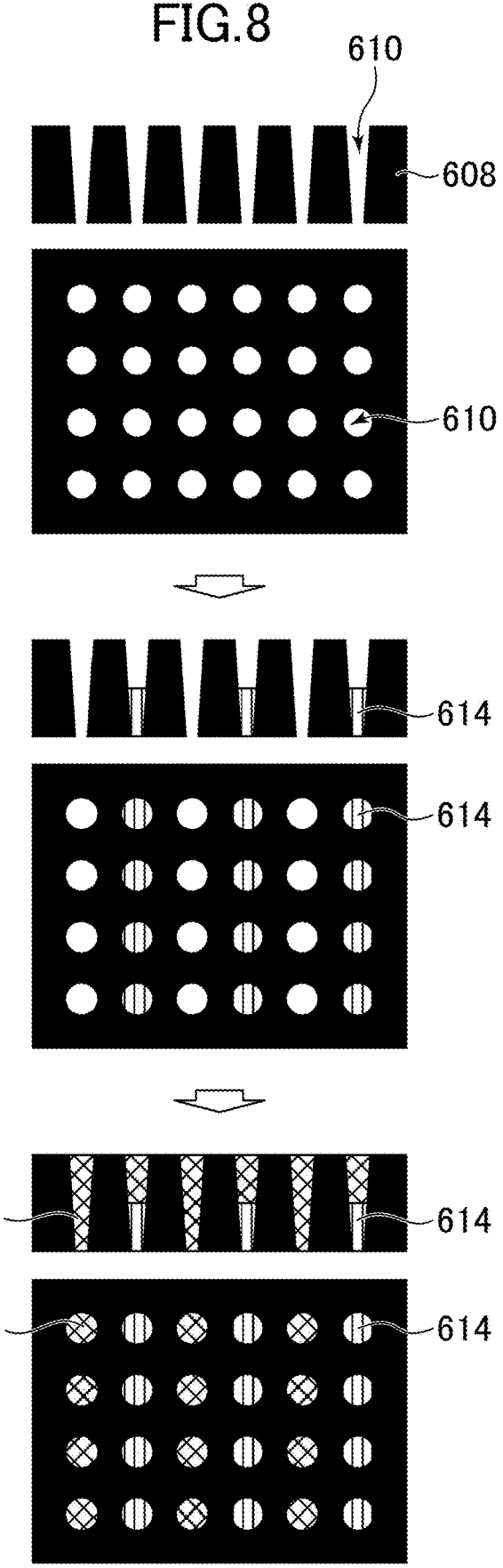
FIG. 8 is a diagram illustrating a manufacturing method of an interposer according to a modification of the first embodiment.

One or both of the first wavelength selecting unit 612 and the second wavelength selecting unit 614 may be configured by combining materials that transmit light in different wavelengths. For example, as shown in FIG. 8, after the through holes 610 belonging to the first group and the through hole 610 belonging to the second group are formed, the through holes 610 belonging to the second group are filled with resins (second wavelength selecting unit 614) that transmit magenta light up to about half the height of the through holes 610. The through holes 610 belonging to the first group and the second group are then filled with resins (first wavelength selecting portion 612) that transmits yellow light up to the upper limit of the height of the through holes 610.

Through such processing, the through holes 610 belonging to the second group are filled with a combination of resins that transmit magenta light and resins that transmits yellow light. As such, the through holes 610 belonging to the second group transmit only red light.

Figure 9A:
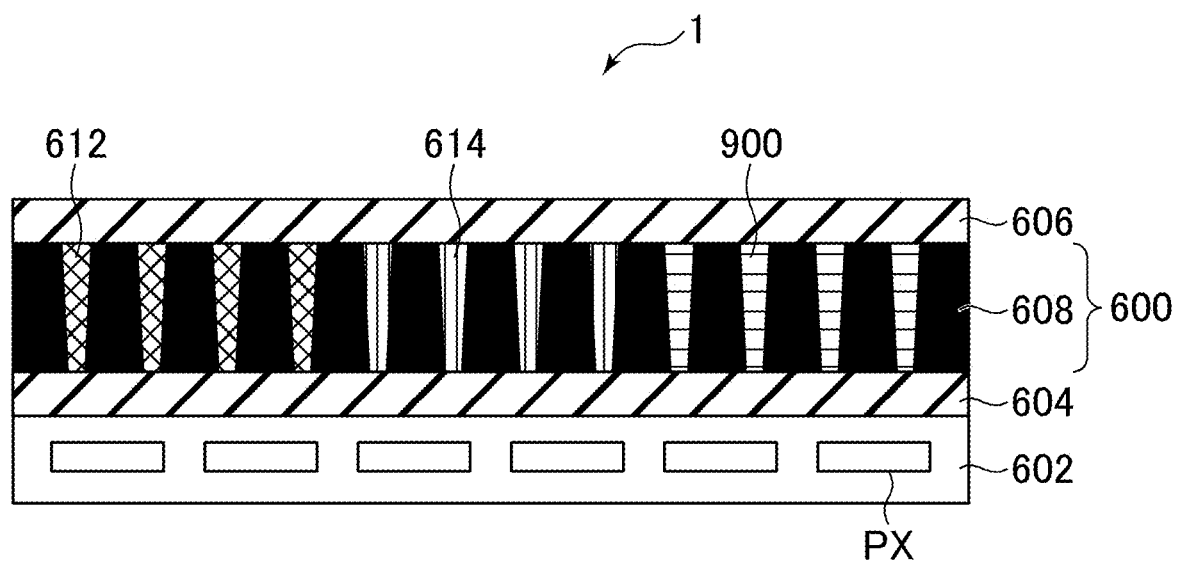
FIG. 9A is a schematic cross-sectional view of the optical sensor according to a modification of the first embodiment.
Figure 9B:
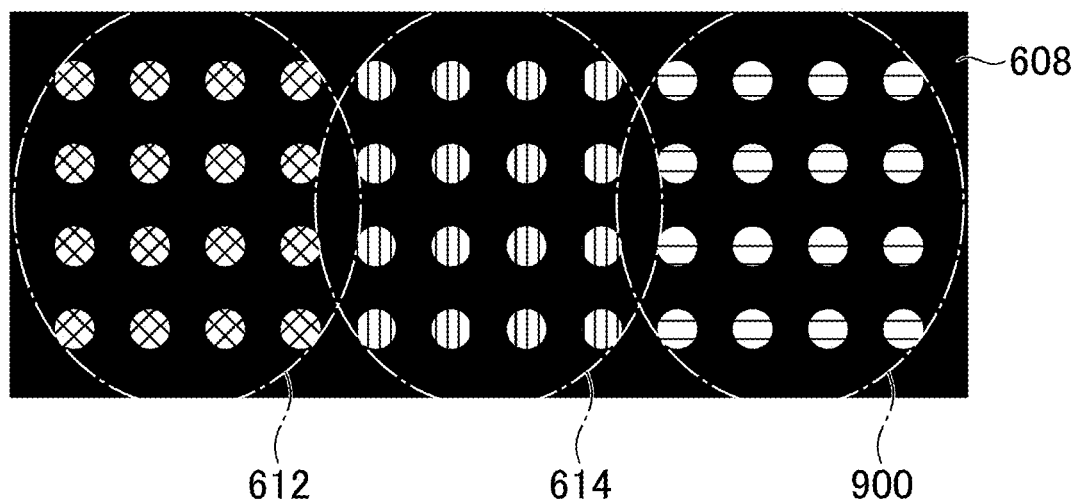
FIG. 9B is a schematic view of an upper surface of the optical sensor according to a modification of the first embodiment.

In the above, the through holes 610 in the odd rows belong to the first group and the through holes 610 in the even rows belong to the second group, but the present disclosure is not limited thereto. For example, as shown in FIGS. 9A and 9B, the first group and the second group may be classified into a plurality of columns (four columns in FIGS. 9A and 9B).

The number of groups is not limited to two, and may be three or more. For example, as shown in FIGS. 9A and 9B, through holes 610 belonging to the first group, through holes 610 belonging to the second group, and through holes 610 belonging to the third group may be provided. The through hole 610 belonging to the first group is filled with the first wavelength selecting units 612, the through hole 610 belonging to the second group is filled with the second wavelength selecting unit 614, and the through hole 610 belonging to the third group is filled with the third wavelength selecting unit 900. The third wavelength selecting unit 900 is a resin that transmits only light in a third wavelength band (e.g., 535 nm to 575 nm centered on 555 nm), for example. In this manner, three or more types of information can be acquired.

The through hole 610 may correspond to one or more pixels PX. For example, as shown in FIG. 9A, a plurality of through holes 610 (four in FIGS. 9A and 9B) may be provided for each pixel PX.

The through holes 610 belonging to the first group and the through holes 610 belonging to the second group may respectively correspond to group areas PAG. For example, the through holes 610 of four rows and four columns belonging to the first group shown in FIG. 9B may correspond to a group area PAG. Similarly, the through holes 610 belonging to the second group and the third group of four rows and four columns may each correspond to a group area PAG.

The through hole 610 belonging to the first group may be different in size from the through hole 610 belonging to the second group. For example, the diameter of the through hole 610 filled with the wavelength selecting unit having the high detection sensitivity may be made smaller compared to the other through holes 610 belonging to the first group and the second group. Further, the sensitivity of the photodiode 30 corresponding to the through hole 610 belonging to the first group may be different from the sensitivity of the photodiode 30 corresponding to the through hole 610 belonging to the second group. This enables to uniform the intensity of the first detection signals Vdet corresponding to the through holes 610 belonging to the first group and the through holes 610 belonging to the second group.

As described above, the optical sensor including the first wavelength selecting unit 612 and the second wavelength selecting unit 614 enables to obtain a plurality of types of information on a plurality of wavelengths in a short time. The related art also describes sequentially irradiating a measuring object with light in a plurality of wavelength bands at intervals and sensing reflected light and transmitted light from the measuring object, thereby obtaining a plurality of types of information on the measuring object. However, according to the present disclosure, it is possible to obtain a plurality of types of information with a plurality of wavelengths in a short time.

Figure 10A:
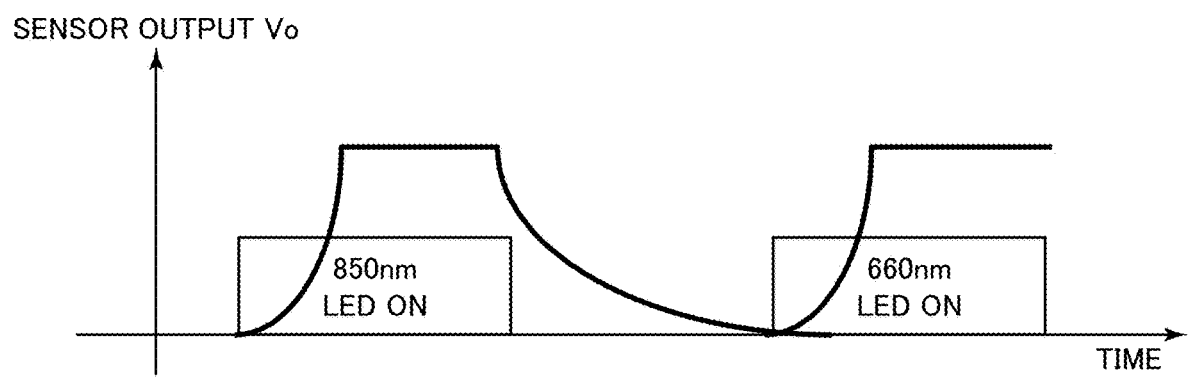
FIG. 10A is a diagram illustrating a time change of a sensor output.
Figure 10B:
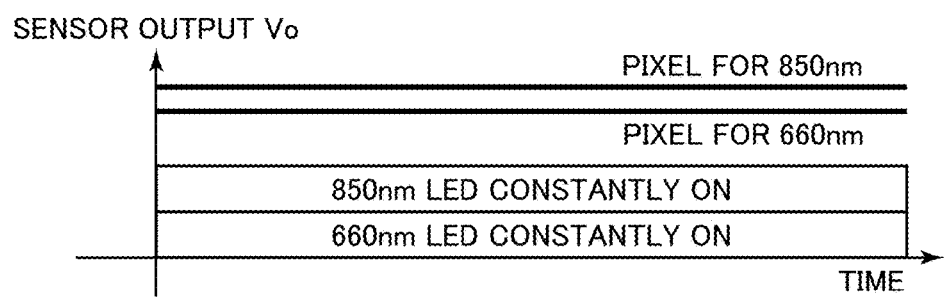
FIG. 10B is a diagram illustrating a time change of a sensor output.

FIG. 10A is a diagram illustrating a time change of the sensor output in the related art (time division), and FIG. 10B is a diagram illustrating a time change of the sensor output in the present disclosure. In FIGS. 10A and 10B, the vertical axis is the sensor output Vo and the horizontal axis is time. It is assumed that the coordinate extracting unit 46 outputs the first detected signal Vdet as the sensor output Vo.

As shown in FIG. 10A, according to the related art, an LED emitting light of 850 nm and an LED emitting light of 660 nm are alternately turned on. The sensor output Vo starts to increase as the LED is turned on and increases to a constant voltage corresponding to the amount of light of the LED and then stabilizes. Subsequently, the sensor outputs Vo that are output from all the partial detection areas PAA are obtained one time (or a predetermined number of times) at a time. The power supply circuit 28 turns off the LED when the reference signal COM is supplied to the additional capacitance Cad (see FIG. 4) included in the partial detection areas PAA.

When the LED is turned off, the sensor output Vo gradually decreases and becomes the initial output voltage value (e.g., 0V) after a certain period of time has elapsed. In order to obtain a plurality of types of information, it is necessary not to mix 850 nm light and 660 nm light sensor outputs Vo. As such, in order to turn on the LED emitting 660 nm light, a certain period of time is required after the LED emitting 850 nm light is turned off. Similarly, in order to turn on the LED emitting 850 nm light, a certain period of time is required after the LED emitting 660 nm light is turned off. In view of this, according to the related art, it takes time to switch the LEDs.

On the other hand, according to the present disclosure, as shown in FIG. 10B, even when the LED emitting 660 nm light and the LED emitting 850 nm light are constantly turned on at the same time, a plurality of types of information can be obtained based on the sensor output Vo of the pixel PX corresponding to the first wavelength selecting unit 612 and the sensor output Vo of the pixel PX corresponding to the second wavelength selecting unit 614. Accordingly, it is possible to improve the detection accuracy per time.

Further, the LED emitting both 660 nm and 850 nm light (e.g., white LED) eliminates the need to provide LEDs that emit light of different wavelengths.

Second Embodiment

Figure 11A:
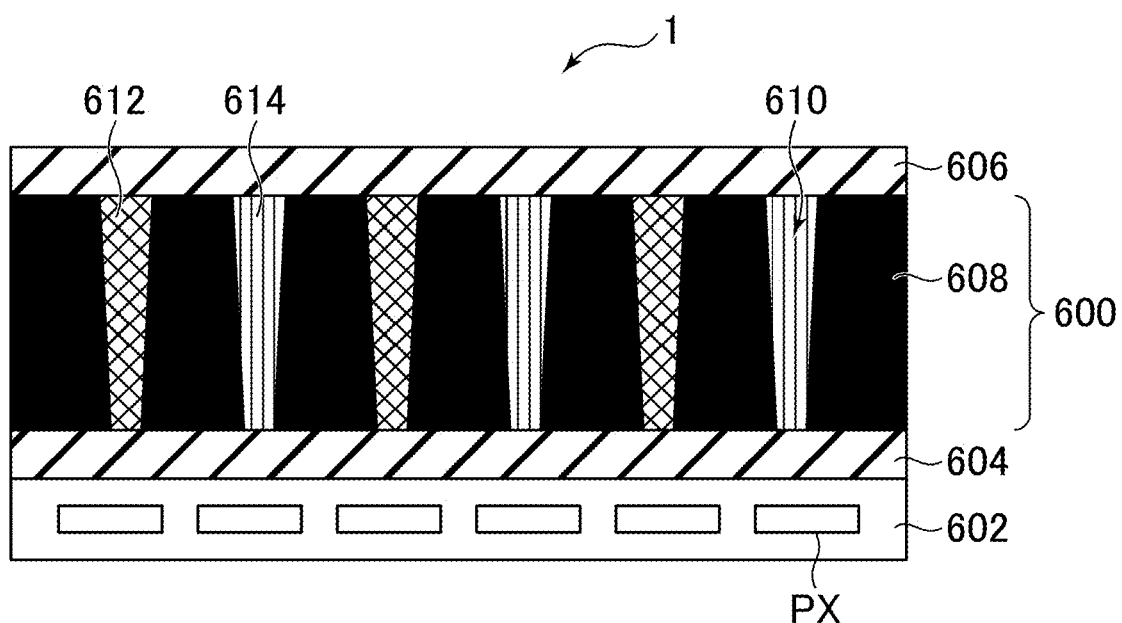
FIG. 11A is a schematic cross-sectional view of the optical sensor according to the second embodiment.
Figure 11B:
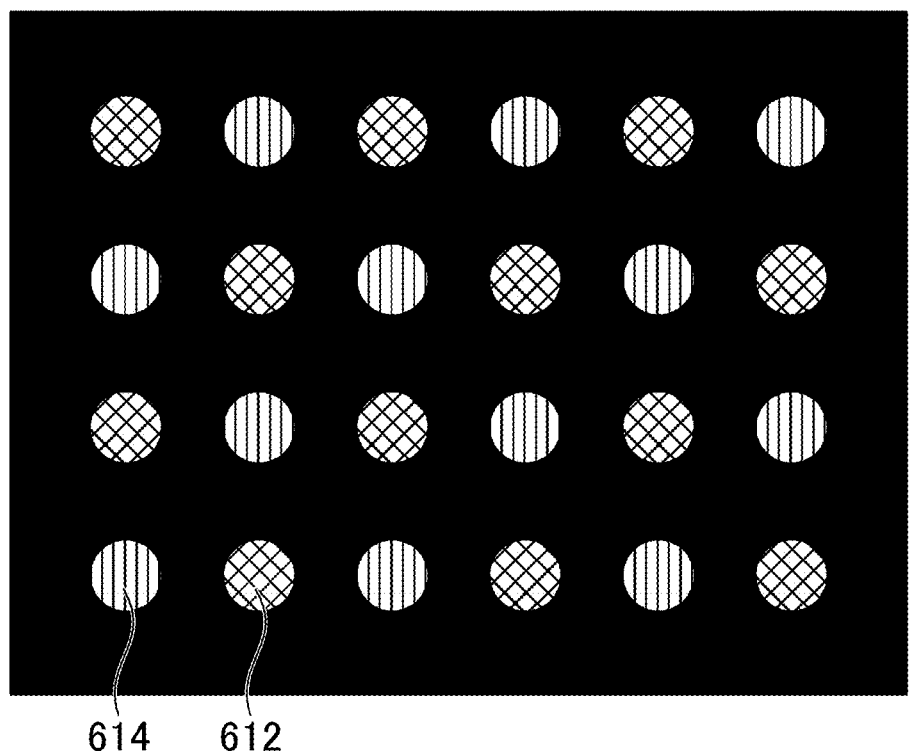
FIG. 11B is a schematic view of an upper surface of the optical sensor according to the second embodiment.

Next, the second embodiment will be described. In the following, the same structure as that of the first embodiment will not be described. FIG. 11A is a schematic cross-sectional view of the optical sensor 1 according to the second embodiment. FIG. 2 is a schematic plan view of the optical sensor 1 according to the second embodiment. In the second embodiment, the plurality of pixels and through holes 610 are arranged in a matrix, and the through holes 610 belonging to the second group are disposed four sides of each of the through holes 610 belonging to the first group.

Specifically, the through holes 610 belonging to the first group and the through holes 610 belonging to the second group are alternately provided in each column. Further, the through holes 610 belonging to the first group and the through holes 610 belonging to the second group are alternately provided in each row. That is, when viewed in a plan view, the through holes 610 belonging to the first group and the through holes 610 belonging to the second group are arranged in a checkered pattern.

Figure 12:
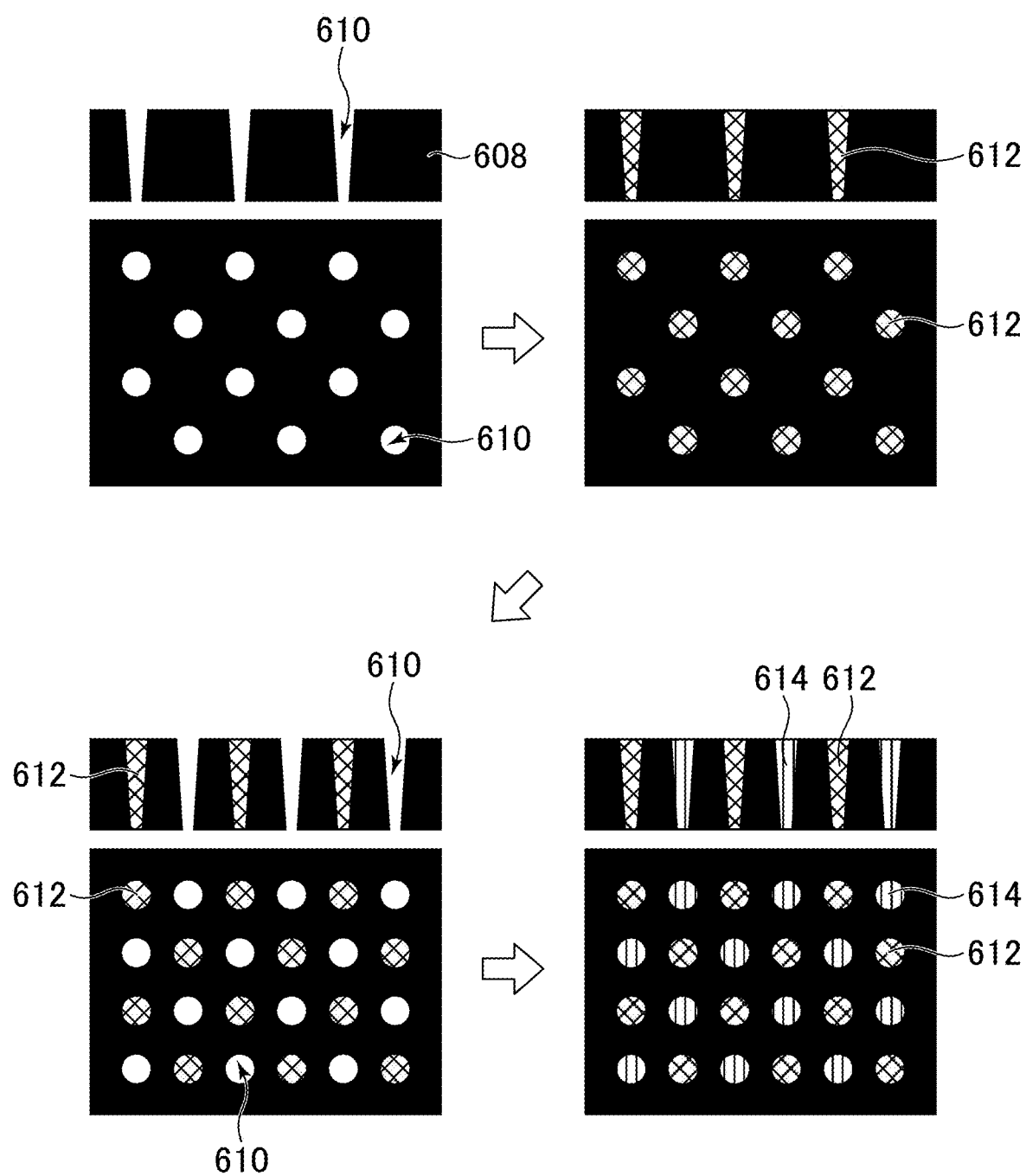
FIG. 12 is a diagram illustrating a manufacturing process of an interposer according to the second embodiment.

FIG. 12 is a diagram illustrating a manufacturing method of the interposer 600 according to the second embodiment. A light shielding film corresponding to the size of the detection area DA is prepared. When a light shielding film is disposed in the sensor unit 602, the through holes 610 are formed at positions overlapping with the respective pixels PX of the light shielding film. At this time, only the through holes 610 belonging to the first group are formed. The through holes 610 belonging to the first group are then filled with resins to be the first wavelength selecting units 612. The through holes 610 belonging to the second group are formed at intermediate positions of the through holes 610 belonging to the first group adjacent to each other. Finally, the through holes 610 belonging to the second group are filled with resins that are to be the second wavelength selecting units 614. In this manner, the interposer 600 according to the second embodiment is manufactured. The processing of filling the resin to be the first wavelength selecting unit 612 and the processing of forming the through holes 610 belonging to the second group may be replaced.

Similarly to the first embodiment, a plurality of types of information can also be obtained by a plurality of wavelengths in a short time in the second embodiment.

Third Embodiment

Figure 13A:
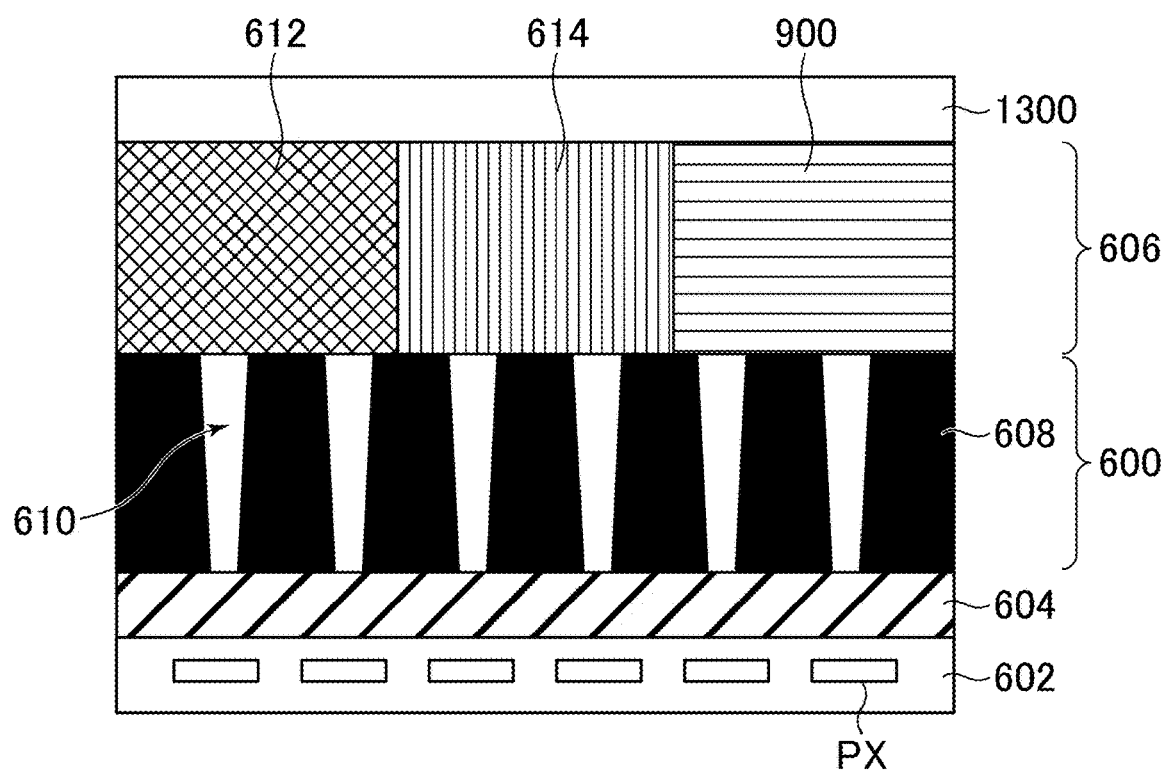
FIG. 13A is a schematic cross-sectional view of the optical sensor according to the third embodiment.
Figure 13B:
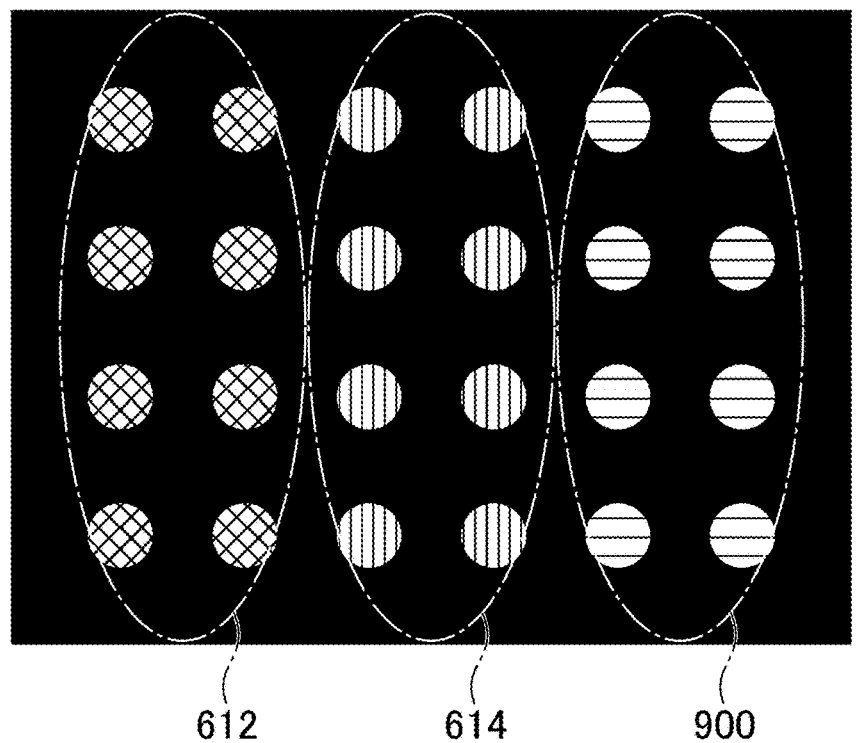
FIG. 13B is a schematic view of an upper surface of the optical sensor according to the third embodiment.

Next, the third embodiment will be described. The same structure as that of the first embodiment will not be described. FIG. 13A is a schematic cross-sectional view of the optical sensor 1 according to the third embodiment. FIG. 13B is a schematic view of an upper surface of the optical sensor 1 according to the third embodiment. According to the third embodiment, the optical sensor 1 further includes a cover member 1300 disposed on the upper side of the interposer 600 to cover thereof, and the wavelength selecting units are formed as a light-transmitting adhesive film that adheres the interposer 600 and the cover member 1300.

Specifically, as shown in FIGS. 13A and 13B, the through hole 610 is filled with a resin that transmits light in the entire wavelength range of visible light (i.e., transparent). The through hole 610 may include nothing to fill therein (i.e., there is air).

A first wavelength selecting unit 612, a second wavelength selecting unit 614, and a third wavelength selecting unit 900 are disposed on the interposer 600. Specifically, a first adhesive film 604 that transmits only light in the first wavelength band (e.g., 640 nm to 680 nm centered on 660 nm) is disposed, as the first wavelength selecting unit 612, on the through holes 610 in the first and second rows. A second adhesive film 606 that transmits only light in the second wavelength band (e.g., 830 nm to 870 nm centered on 850 nm) is disposed, as the second wavelength selecting unit 614, on the through holes 610 in the third and fourth rows. A third adhesive film that transmits only light in the third wavelength band (e.g., 340 nm to 380 nm centered on 360 nm) is disposed, as the third wavelength selecting unit 900, on the through holes 610 in the fifth and sixth rows.

Similarly to the first embodiment, a plurality of types of information can also be obtained by a plurality of wavelengths in a short time in the third embodiment. In the third embodiment, the optical sensor is slightly thicker compared to the first embodiment and the second embodiment, although the processing of filling the through hole 610 can be omitted, which serves to facilitate easier production.

The present invention is not limited to the above embodiment, and various modifications can be made. For example, a replacement can be made with a configuration that is substantially the same as the configuration shown in the above-described embodiment, a configuration that exhibits the same operational effect, or a configuration that can achieve the same object.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. An optical sensor comprising:
a light receiving part that includes a plurality of pixels disposed in a plane surface and receives light from a measuring object;
an interposer that includes a plurality of through holes and is disposed on an upper side of the light receiving part;
a first resin that transmits light only in a first wavelength band and that overlaps each of the plurality of through holes belonging to a first group; and
a second resin that transmits light only in a second wavelength band different from the first wavelength band and that overlaps each of the plurality of through holes belonging to a second group, which is different from the first group,
wherein
the plurality of pixels includes first pixels and second pixels,
each of the first pixels overlaps two or more of the plurality of through holes belonging to the first group, and
each of the second pixels overlaps two or more of the plurality of through holes belonging to the second group.

2. The optical sensor according to claim 1, wherein the first resin and the second resin are each disposed inside the plurality of through holes.

3. The optical sensor according to claim 2, wherein the plurality of pixels and the plurality of through holes are arranged in a matrix, and
the first group and the second group are disposed in a plane.

4. The optical sensor according to claim 2, wherein the plurality of pixels and the plurality of through holes are arranged in a matrix, and
the through holes belonging to the first group and the through holes belonging to the second group are alternately arranged in both first and second directions perpendicular to each other.

5. The optical sensor according to claim 1, further comprising a cover member that is disposed on an upper side of the interposer and covers the interposer, wherein
the first resin and the second resin are formed as light-transmitting adhesive films that adhere the interposer and the cover member.

6. The optical sensor according to claim 1, wherein a size of an opening of each of the plurality of through holes on the light receiving part side is smaller than a size of an opening of each of the plurality of through holes on an opposite side.

* * * * *